(12) United States Patent
Jensen

(10) Patent No.: US 12,218,569 B2
(45) Date of Patent: Feb. 4, 2025

(54) STATOR SEGMENT, STATOR, WIND TURBINE AND METHOD OF MANUFACTURING A STATOR SEGMENT

(71) Applicant: Siemens Gamesa Renewable Energy A/S, Brande (DK)

(72) Inventor: Simon Vyff Jensen, Tørring (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 111 days.

(21) Appl. No.: 17/796,333

(22) PCT Filed: Jan. 13, 2021

(86) PCT No.: PCT/EP2021/050547
§ 371 (c)(1),
(2) Date: Jul. 29, 2022

(87) PCT Pub. No.: WO2021/156029
PCT Pub. Date: Aug. 12, 2021

(65) Prior Publication Data
US 2023/0107708 A1    Apr. 6, 2023

(30) Foreign Application Priority Data
Feb. 6, 2020  (EP) ..................... 20155826

(51) Int. Cl.
*H02K 1/18*  (2006.01)
*H02K 7/18*  (2006.01)
*H02K 15/02* (2006.01)

(52) U.S. Cl.
CPC ............. *H02K 7/183* (2013.01); *H02K 1/187* (2013.01); *H02K 15/02* (2013.01); *H02K 2201/15* (2013.01); *H02K 2213/12* (2013.01)

(58) Field of Classification Search
CPC ........ H02K 1/187; H02K 15/02; H02K 1/148; H02K 7/183; H02K 1/20; F03D 9/25
See application file for complete search history.

(56) References Cited

U.S. PATENT DOCUMENTS

| | | | |
|---|---|---|---|
| 2012/0133145 A1* | 5/2012 | Longtin ................. | H02K 1/185 290/55 |
| 2015/0084454 A1* | 3/2015 | Noer ...................... | H02K 1/148 310/58 |

(Continued)

FOREIGN PATENT DOCUMENTS

DE    10 2017 206873 A1    10/2018

OTHER PUBLICATIONS

International Search Report and Written Opinion for PCT/EP2021/050547, issued on Mar. 17, 2021.

*Primary Examiner* — Leda T Pham
(74) *Attorney, Agent, or Firm* — Schmeiser, Olsen & Watts LLP

(57) ABSTRACT

A stator segment for an electric machine, in particular for a wind turbine generator is provided, the stator segment including a support structure, a lamination stack, and at least one fastening member for fastening the lamination stack to the support structure, wherein the lamination stack includes a plurality of lamination packets stacked between a drive end and a non-drive end, each lamination packet including a yoke having a plurality of teeth extending radially outwards on one side of the yoke and a connection structure formed at the side opposite the teeth, the connection structure being shaped to engage with the at least one fastening member in such a way that a part of the fastening member extends within the yoke. Furthermore, a stator, a wind turbine and a method of manufacturing are provided.

7 Claims, 4 Drawing Sheets

(56) References Cited

U.S. PATENT DOCUMENTS

2015/0349592 A1    12/2015  Winkler
2020/0136442 A1*   4/2020  Andersen ............... H02K 7/183

* cited by examiner

STATOR SEGMENT, STATOR, WIND TURBINE AND METHOD OF MANUFACTURING A STATOR SEGMENT

CROSS-REFERENCE TO RELATED APPLICATIONS

This application claims priority to PCT Application No. PCT/EP2021/050547, having a filing date of Jan. 13, 2021, which claims priority to EP Application No. 20155826.9, having a filing date of Feb. 6, 2020, the entire contents both of which are hereby incorporated by reference.

FIELD OF TECHNOLOGY

The following relates to the field of electric machines, more specifically to a stator segment for an electric machine, such as a wind turbine generator, and a method of manufacturing such a stator segment. The following further relates to a stator comprising a plurality of stator segments, and a wind turbine comprising such a stator.

BACKGROUND

Stators for large electrical machines, such as wind turbine generators, are often formed by mechanically connecting a plurality of stator segments, each comprising a lamination stack (forming the yoke and teeth or slots for the generator windings) mounted on a support structure.

The task of securely mounting the lamination stack on the support structure is not trivial. Welding is one possibility, but it is unsuited for some types of lamination material, in particular Grain Oriented Electrical Steel (GOES). Recent attempts involve a dovetail connection where a fastening member is slid into a corresponding structure protruding from the yoke of the lamination stack and fixated to the support structure. However, such a protruding structure has a number of drawbacks. One drawback is that the protruding structure takes up place without contributing correspondingly to power production. Furthermore, forming the protruding structure while stamping the lamination results in a significant amount of scrap material and thus adds significantly to the manufacturing costs.

Accordingly, there may be a need for a stator segment with a reliable mechanical connection between lamination stack and support structure formed without an undesirable increase in size and with less scrap material resulting from the manufacture.

SUMMARY

An aspect relates to a stator segment for an electric machine, in particular for a wind turbine generator. The stator segment comprises a support structure, a lamination stack, and at least one fastening member for fastening the lamination stack to the support structure, wherein the lamination stack comprises a plurality of lamination packets stacked between a drive end and a non-drive end (i.e. in the axial direction of the electric machine), each lamination packet comprising a yoke having a plurality of teeth extending radially outwards on one side of the yoke and a connection structure formed at the side opposite the teeth, the connection structure being shaped to engage with the at least one fastening member in such a way that a part of the fastening member extends within the yoke.

This aspect of embodiments of the invention is based on the idea that a part of the fastening member is allowed to extend within the yoke. Thereby, the fastening member and the connection structure consume less space (in the radial direction) and less scrap material is produced during stamping of the lamination material (since the corresponding connection structure protrudes less from the yoke, such that less material has to be removed to form the connection structure).

According to an embodiment of the invention, the support structure is formed in such a way that the part of the fastening member extends within the yoke at a position directly opposite to one of the plurality of teeth.

Thereby, the part of the fastening member that extends within the yoke is located at the part of the yoke where the possible negative impact on the magnetic properties of the yoke is minimal. In other words, the magnetic properties of the yoke in areas between the teeth, i.e., below the stator windings, remain undisturbed by the connection structure and the fastening member.

According to a further embodiment of the invention, the connection structure comprises at least one elongate recess extending from the drive end towards the non-drive end, the elongate recess extending at least partially within the yoke.

In the present context, the term "drive end" refers to the end of the stator pointing towards a rotor (e.g., with turbine blades) is located while the term "non-drive end" refers to the opposite end of the stator. In other words, the elongate recess extends in a direction parallel to an axis of the electric machine (or generator). At least a part of the recess is formed within the yoke, while the remaining part of the recess may be formed within a part of the connection structure that is located outside of the yoke.

According to a further embodiment of the invention, the at least one fastening member comprises a rod shaped to fit slidably into the elongate recess.

In other words, the rod has a shape that can be positioned within the elongate recess by sliding it into the recess, i.e., by moving the rod and the connection structure relative to each other in the direction of the recess.

According to a further embodiment of the invention, the elongate recess and the rod have corresponding cross-sectional shapes adapted to form a dovetail connection.

In other words, once the rod has been slid or pushed into position within the recess, the rod cannot be removed by pulling or drawing it in a direction perpendicular to the recess. Thus, by attaching the rod to the support structure and thereby preventing the rod from moving in the direction of the recess, the lamination stack can be fastened to the support structure with the rod as an intermediate element.

According to a further embodiment of the invention, the corresponding shapes are selected from the group consisting of a triangular shape, a trapezoidal shape, and a half-moon shape.

Generally, the width of the recess is larger within the yoke and smaller at the edge and outside of the yoke.

According to a further embodiment of the invention, the connection structure comprises at least one protruding portion protruding from the yoke, wherein a part of the elongate recess extends within the protruding portion.

In other words, the part of the recess having the smallest width extends within the protruding portion.

According to a further embodiment of the invention, the rod comprises a plurality of threaded holes arranged to allow fastening of the rod to the support structure by a corresponding plurality of bolts.

In this embodiment, the narrowest part of the recess is wide enough to allow the bolts to extend into the holes in the rod.

According to a second aspect of embodiments of the invention, there is provided a stator for an electric machine, in particular for a wind turbine generator. The stator comprises a plurality of stator segments according to the first aspect or any of the embodiments described above, wherein the support structures of the stator segments are mechanically connected to each other in order to form an annular stator.

The stator according to this aspect benefits from all the advantages described above in conjunction with the individual stator segments.

According to a third aspect of embodiments of the invention, there is provided a wind turbine comprising a wind turbine generator, the wind turbine generator comprising a stator according to the second aspect, and a rotor rotatably arranged relative to the stator.

By using the stator structure described above in a wind turbine generator, a more efficient generator in terms of size and cost is obtained.

According to a fourth aspect of embodiments of the invention, there is provided a method of manufacturing a stator segment for an electric machine, in particular for a wind turbine generator. The method comprises (a) providing a support structure, (b) providing a lamination stack, and (c) providing at least one fastening member for fastening the lamination stack to the support structure, wherein the lamination stack comprises a plurality of lamination packets stacked between a drive end and a non-drive end, each lamination packet comprising a yoke having a plurality of teeth extending radially outwards on one side of the yoke and a connection structure formed at the side opposite the teeth, the connection structure being shaped to engage with the at least one fastening member in such a way that a part of the fastening member extends within the yoke.

This aspect of embodiments of the invention is generally based on the same idea as the first aspect described above and provides the same and similar advantages in terms of manufacturing the stator segment.

It is noted that embodiments of the invention have been described with reference to different kinds of subject matter. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different types of subject matter, in particular to combinations of features of the method type claims and features of the apparatus type claims, is part of the disclosure of this document.

The aspects defined above, and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

BRIEF DESCRIPTION

Some of the embodiments will be described in detail, with reference to the following figures, wherein like designations denote like members, wherein.

DETAILED DESCRIPTION

Figure 1:
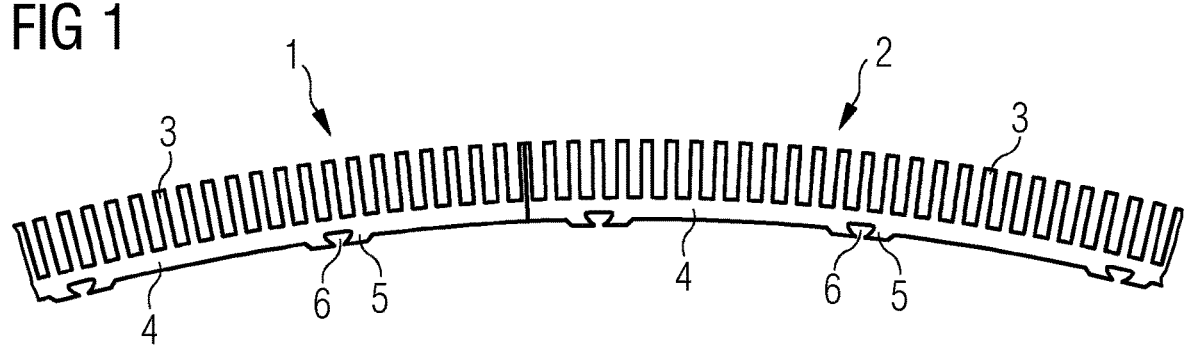
FIG. 1 shows a cross-sectional view of a set of lamination sheets for a stator segment according to the conventional art.

FIG. 1 shows a cross-sectional view of a set of lamination sheets 1, 2 for forming a lamination stack of a corresponding stator segment according to the conventional art discussed in the introductory portion of this document. The lamination sheets 1, 2 have an arc-like shape and can be combined with further lamination sheets to form a lamination stack. As shown, the left lamination sheet 1 is shorter than the right lamination sheet. This size difference allows stacking of the sheets like bricks in a wall, i.e., such that the sheets overlap each other. In other words, the next layer of sheets to be stacked on top of the sheets 1, 2 shown in FIG. 1 would be arranged with the longer sheet to the left and the shorter sheet to the right. The resulting stator segment can then be combined with further segments to form an annular stator structure. Each lamination sheet 1, 2 comprises a plurality of teeth 3 extending from yoke 4. To form an electric machine, such as a wind turbine generator, windings are arranged between the teeth such that electrical currents are induced therein when a magnetic rotor (not shown) is moved relative to the stator. Furthermore, connection structures 5 extend from the side of the yoke 4 that is opposite from the teeth 3, i.e., the lower side of yoke 4 in the drawing. Each connection structure 5 comprises a recess or hollow portion 6 formed to engage with a fastening member (not shown, discussed further below) in order to secure the resulting lamination stack of lamination sheets 1, 2 to a support structure (not shown, discussed further below) of a corresponding stator segment. As can be seen, the connection structures 5 extend away from the yoke 4 and thus adds to the radial width of the lamination sheets 1, 2. As mentioned in the introduction, forming of the connection structures 5 by stamping the lamination sheets 1, 2 results in a considerable amount of scrap material and thus also adds to the production costs. The connection structures 5 are evenly distributed along arc-shaped yokes 4.

Figure 2:
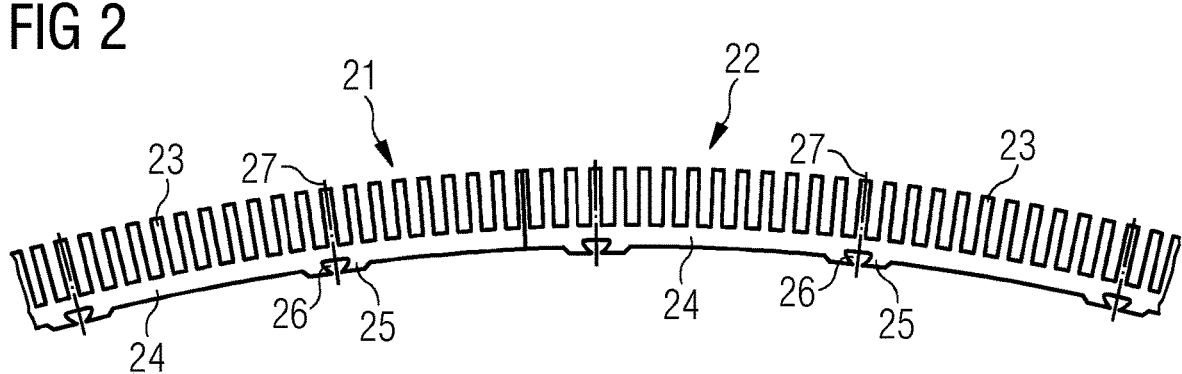
FIG. 2 shows a cross-sectional view of a set of lamination sheets for a stator segment according to an embodiment of the present invention.

FIG. 2 shows a cross-sectional view of a set of lamination sheets 21, 22 for forming a lamination stack of a stator segment according to an embodiment of the present invention. While the overall structure is similar to that shown in FIG. 1, the lamination sheets 21, 22 differ in that the recesses 26 of the connection structures 25 extend partially within the yokes 24. Accordingly, the connection structures 25 does not extend as far out from the yokes 24 as in the structure shown in FIG. 1. Thus, the radial size of the lamination sheets 21, 22 (and thereby the radial size of the resulting lamination stack) as well as the resulting amount of scrap material is comparatively reduced. Furthermore, in the embodiment shown in FIG. 2, each connection structure 25 is positioned directly behind (i.e., opposite to) one of the teeth 23, as indicated by lines 27. Thereby, the reduced amount of yoke material caused by the recesses 26 does not significantly influence the magnetic and electric properties of the yoke 24.

Figure 3:
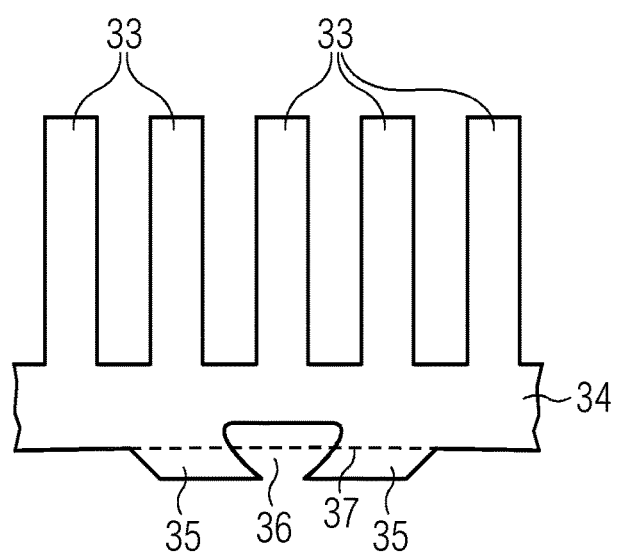
FIG. 3 shows a close-up view of a part of FIG. 2.

FIG. 3 shows a close-up view of a part of FIG. 2 and clearly shows that about one-third of the recess 36 extends within the yoke 34, i.e., above the dashed line 37.

Figure 4:
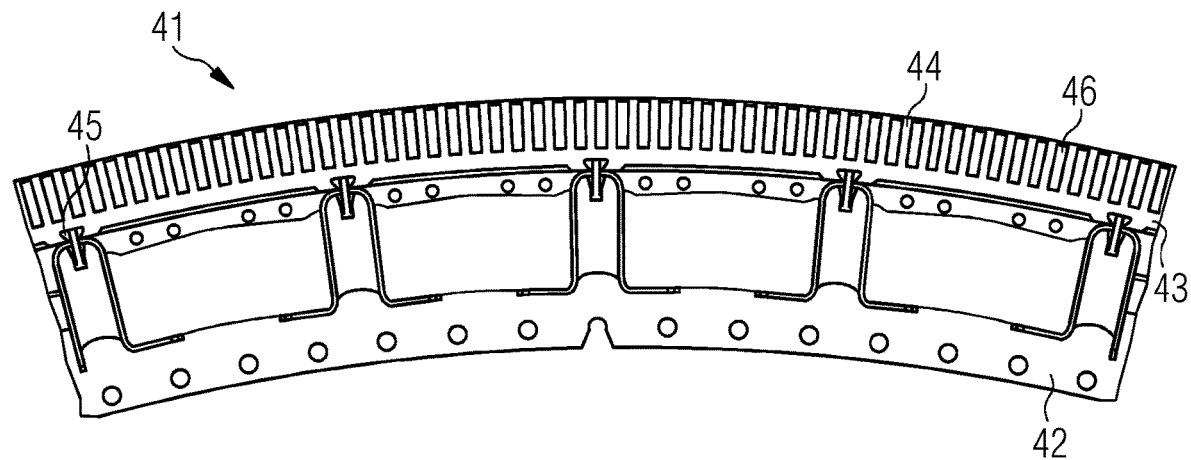
FIG. 4 shows a cross-sectional view of a stator segment according to an embodiment of the present invention.

FIG. 4 shows a cross-sectional view of a stator segment 41 according to an embodiment of the present invention. The stator segment 41 comprises a support structure 42 on which a lamination stack with yoke 43 and teeth 44 is fastened by fastening members 45. Windings 46 are arranged between the teeth 44.

Figure 5:
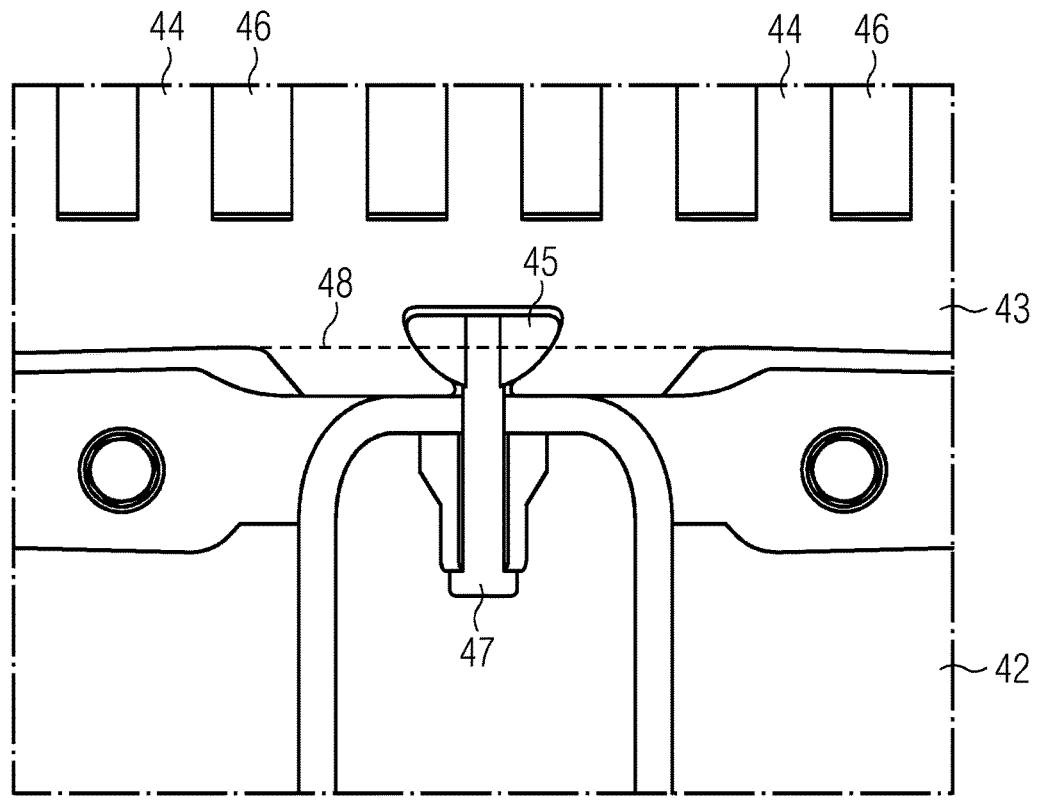
FIG. 5 shows a close-up view of a part of FIG. 4.

FIG. 5 shows a close-up view of a part of FIG. 4. Here, it can be seen how a rod-shaped fastening member 45 is arranged within a recess and partially extends within the yoke 43 as indicated by the dashed line 48. The recess and the fastening member 45 forms a dovetail connection and the rod 45 is secured to the support structure 42 by bolts 47.

Figure 6:
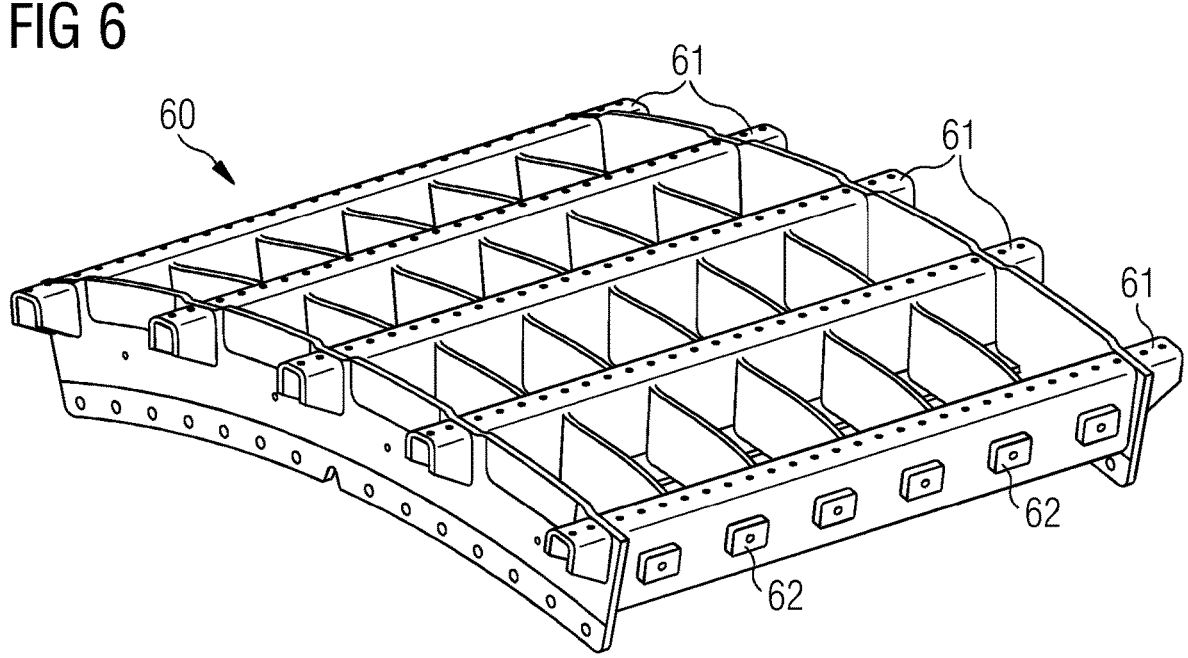
FIG. 6 shows a perspective view of a support structure in accordance with an embodiment of the present invention.

FIG. 6 shows a perspective view of a support structure 60 in accordance with an embodiment of the present invention. As shown, the support structure comprises an arc-shaped frame having several connection structures 61 and 62 for engaging respectively with a fastening member (see FIG. 8) and corresponding connection structures of neighboring stator segments. The elongate connection structures 61 each comprises a number of holes allowing bolt connections with a rod-shaped fastening member 45 as shown in FIG. 5 and discussed above.

Figure 7:
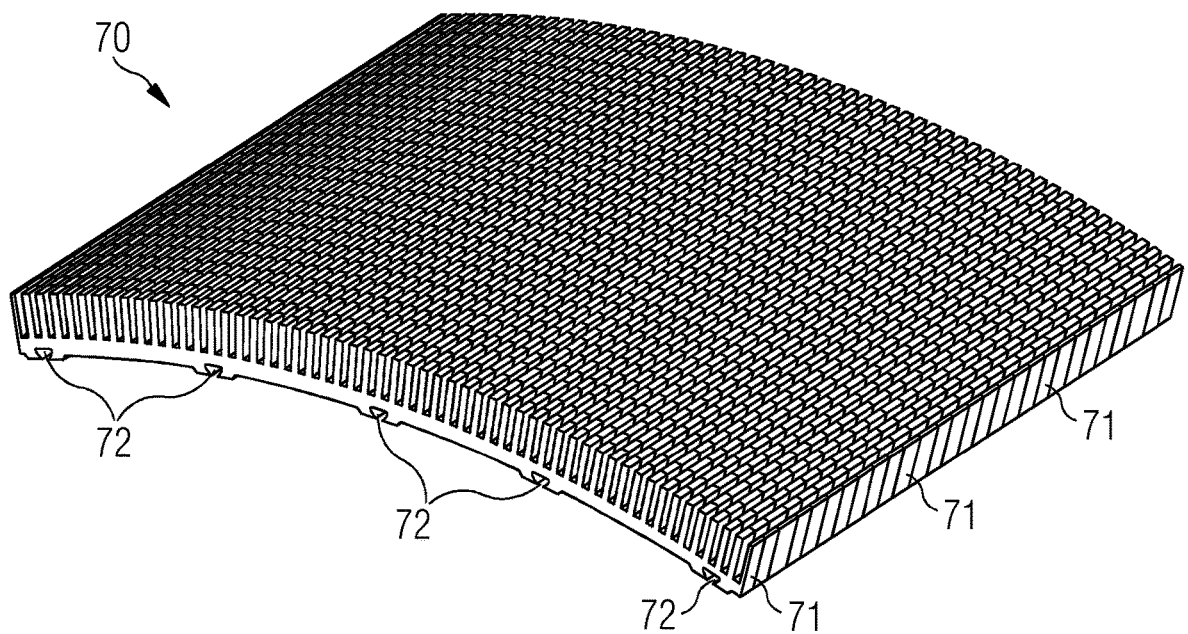
FIG. 7 shows a perspective view of a lamination stack in accordance with an embodiment of the present invention.

FIG. 7 shows a perspective view of a lamination stack 70 in accordance with an embodiment of the present invention. The lamination stack 70 comprises a plurality of packets 71 arranged with a small gap between them. Each packet 71 comprises laminated iron material with a cross-sectional shape corresponding to the shapes shown e.g., in FIG. 2 and discussed above. Similar to the structures shown in FIGS. 2 to 5, the lamination stack 70 comprises connection structures 72 for securing the lamination stack 70 to a support structure using a fastening member as discussed above.

Figure 8:
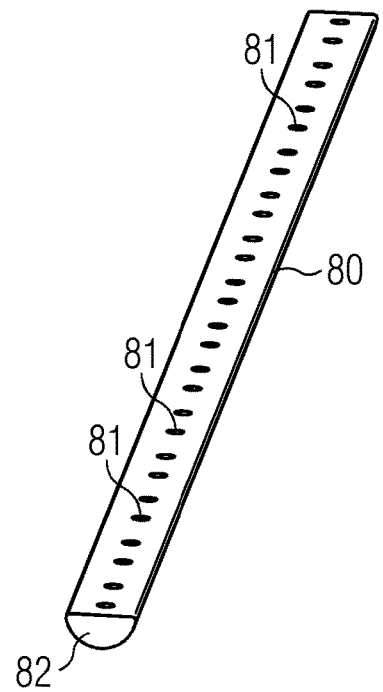
FIG. 8 shows a perspective view of a rod-shaped fastening member in accordance with an embodiment of the present invention.

FIG. 8 shows a perspective view of a rod-shaped fastening member 80 in accordance with an embodiment of the present invention. The fastening member 80 comprises holes 81 for receiving bolt as shown e.g., in FIG. 5 and discussed above in order to secure a lamination stack to a support structure. The fastening member has an end 82 and comprises a cross-sectional shape (in this embodiment a half-moon shape) that fits into a corresponding recess (e.g., 26 or 36) to form a dovetail joint.

Figure 9:
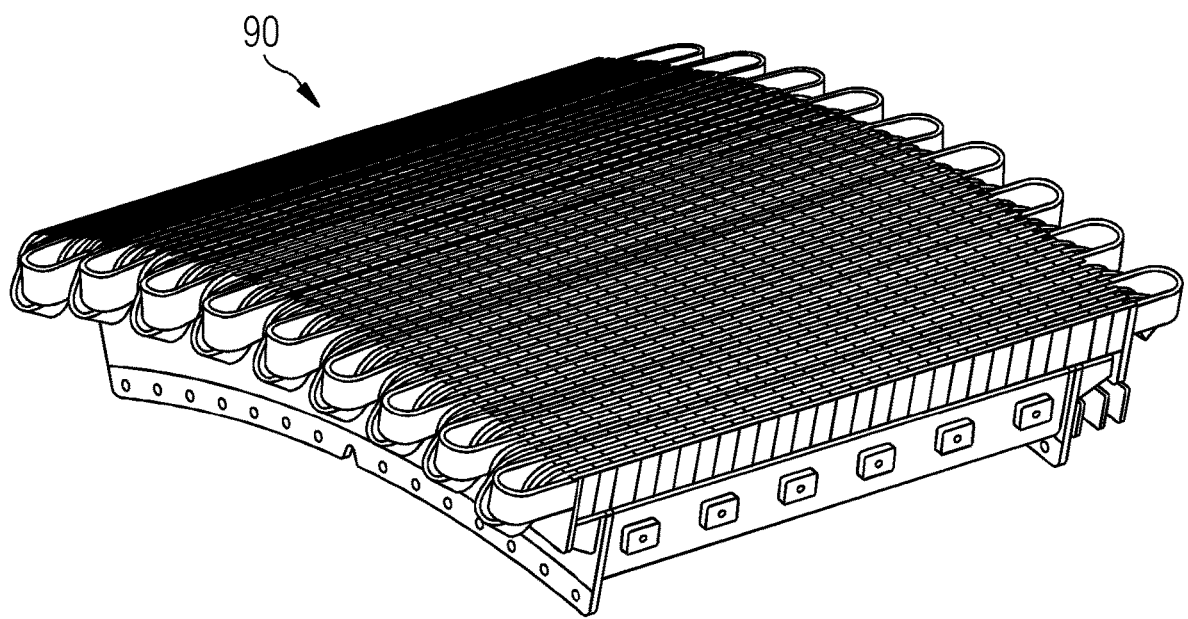
FIG. 9 shows a perspective view of a stator segment in accordance with an embodiment of the present invention.

FIG. 9 shows a perspective view of a stator segment 90 in accordance with an embodiment of the present invention. More specifically, the stator segment comprises a support structure 60 as shown in FIG. 6, a lamination stack 70 as shown in FIG. 7, and a fastening member 80 as shown in FIG. 8.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A stator segment for an electric machine, the stator segment comprising:
   a support structure;
   a lamination stack; and
   at least one fastening member for fastening the lamination stack to the support structure;
   wherein the lamination stack comprises a plurality of lamination packets stacked between a drive end and a non-drive end, each lamination packet comprising a yoke having a plurality of teeth extending radially outwards on one side of the yoke and a connection structure formed at a side opposite the teeth, the connection structure being shaped to engage with the at least one fastening member in such a way that a part of the fastening member extends within the yoke;
   wherein the connection structure extends from the side of the yoke opposite the teeth to form at least one elongate recess extending from the drive end towards the non-drive end, the elongate recess extending at least partially within the yoke;
   wherein the at least one fastening member comprises a rod shaped to fit slidably into the at least one elongate recess, and the at least one elongate recess and the rod have corresponding cross-sectional half-moon shape configured to form a dovetail connection.

2. The stator segment according to claim 1, wherein the support structure is formed in such a way that the part of the fastening member extends within the yoke at a position directly opposite to one of the plurality of teeth.

3. The stator segment according to claim 1, wherein the connection structure comprises at least one protruding portion protruding from the yoke, wherein a part of the elongate recess extends within the protruding portion.

4. The stator segment according to claim 1, wherein the rod comprises a plurality of threaded holes arranged to allow fastening of the rod to the support structure by a plurality of bolts that extend into the yoke.

5. A stator for an electric machine, the stator comprising a plurality of stator segments according to claim 1, wherein the support structures of the stator segments are mechanically connected to each other in order to form an annular stator.

6. A wind turbine comprising a wind turbine generator, the wind turbine generator comprising a stator according to claim 5, and a rotor rotatably arranged relative to the stator.

7. A method of manufacturing a stator segment for an electric machine, the method comprising:
   providing a support structure;
   providing a lamination stack; and
   providing at least one fastening member for fastening the lamination stack to the support structure,
   wherein the lamination stack comprises a plurality of lamination packets stacked between a drive end and a non-drive end, each lamination packet comprising a yoke having a plurality of teeth extending radially outwards on one side of the yoke and a connection structure formed at a side opposite the teeth, the connection structure being shaped to engage with the at least one fastening member in such a way that a part of the fastening member extends within the yoke, and the connection structure extends from the side of the yoke opposite the teeth to form at least one elongate recess extending from the drive end towards the non-drive end, the elongate recess extending at least partially within the yoke;
   wherein the at least one fastening member comprises a rod shaped to fit slidably into the at least one elongate recess, and the at least one elongate recess and the rod have corresponding cross-sectional half-moon shape configured to form a dovetail connection.

* * * * *